(12) United States Patent
Anaparti et al.

(10) Patent No.: US 10,820,527 B2
(45) Date of Patent: Nov. 3, 2020

(54) BALER WITH NETWRAP ROLL LOADING DEVICE

(71) Applicant: Deere & Company, Moline, IL (US)

(72) Inventors: Phani Anaparti, Pune (IN); Subhadra I. Maithili, Pune (IN)

(73) Assignee: DEERE & COMPANY, Moline, IL (US)

( * ) Notice: Subject to any disclaimer, the term of this patent is extended or adjusted under 35 U.S.C. 154(b) by 199 days.

(21) Appl. No.: 16/034,922

(22) Filed: Jul. 13, 2018

(65) Prior Publication Data

US 2020/0015426 A1 Jan. 16, 2020

(51) Int. Cl.
*A01F 15/00* (2006.01)
*A01F 15/07* (2006.01)

(52) U.S. Cl.
CPC .. *A01F 15/0715* (2013.01); *A01F 2015/0745* (2013.01)

(58) Field of Classification Search
CPC ............... A01F 15/071; A01F 15/0715; A01F 2015/0745; A01F 2015/076
USPC .......................................................... 53/587
See application file for complete search history.

(56) References Cited

U.S. PATENT DOCUMENTS

| | | |
|---|---|---|
| 3,176,861 A | 4/1965 | Paul et al. |
| 3,182,826 A | 5/1965 | Mutto |
| 3,578,179 A | 5/1971 | Fujioka |
| 4,152,420 A | 5/1979 | Gaffar et al. |
| 4,362,001 A * | 12/1982 | Cockerham, Jr. ..... B65B 25/148 53/211 |
| 4,569,439 A | 2/1986 | Freye et al. |
| 4,691,503 A | 9/1987 | Frerich |
| 4,697,402 A | 10/1987 | Anstey et al. |
| 4,941,311 A | 7/1990 | Ardueser et al. |
| 5,156,517 A | 10/1992 | Boissonneault |

(Continued)

FOREIGN PATENT DOCUMENTS

| | | |
|---|---|---|
| CA | 2014088 A1 | 12/1990 |
| DE | 102010002730 A1 | 9/2011 |

(Continued)

OTHER PUBLICATIONS

European Search Report issued in counterpart European Patent Application No. 19185235.9 dated Dec. 17, 2019 (07 pages).

(Continued)

*Primary Examiner* — Chelsea E Stinson
(74) *Attorney, Agent, or Firm* — Michael Best & Friedrich LLP (57) ABSTRACT

A baler for use with a netwrap roll, where the baler includes a frame supported on one or more wheels, a housing coupled to the frame and at least partially defining a baling chamber therein, a netwrap assembly having a netwrap frame coupled to the housing and at least partially defining a netwrap chamber, and a loading device at least partially positioned within the netwrap chamber. Where the loading device includes a first frame fixed relative to the netwrap frame, a second frame movable relative to the first frame between a frame stowed position and a frame deployed position, and a carriage movable relative to the second frame between a carriage stowed position and a carriage deployed position, and wherein the carriage is configured to support the netwrap roll.

19 Claims, 11 Drawing Sheets

(56) References Cited

U.S. PATENT DOCUMENTS

| | | | |
|---|---|---|---|
| 5,189,866 A * | 3/1993 | Krutza | A01F 15/071 53/211 |
| 5,348,439 A | 9/1994 | Kuhn, Jr. | |
| 5,561,971 A | 10/1996 | Sampson | |
| 5,974,764 A | 11/1999 | Anstey et al. | |
| 5,979,141 A | 11/1999 | Phillips | |
| 5,996,307 A | 12/1999 | Niemerg et al. | |
| 6,152,675 A | 11/2000 | Compton | |
| 6,267,422 B1 | 7/2001 | Alba | |
| 6,272,816 B1 * | 8/2001 | Viaud | A01F 15/0715 242/441.4 |
| 6,499,610 B2 | 12/2002 | Spitsbergen | |
| 7,082,740 B2 * | 8/2006 | van der Lely | A01F 15/071 53/135.1 |
| 7,237,372 B2 | 7/2007 | Chapon et al. | |
| 7,334,776 B2 | 2/2008 | Kazerooni | |
| 7,430,959 B2 | 10/2008 | Routledge | |
| 7,878,347 B2 | 2/2011 | Alday | |
| 7,900,427 B2 | 3/2011 | Chapon et al. | |
| 7,946,095 B2 * | 5/2011 | Olander | A01F 15/0715 53/118 |
| 8,479,933 B2 | 7/2013 | Vaquera | |
| 8,919,085 B2 | 12/2014 | Smith et al. | |
| 8,925,287 B2 * | 1/2015 | Derscheid | A01F 15/0715 53/168 |
| 9,016,032 B2 | 4/2015 | Chapon et al. | |
| 9,320,199 B2 | 4/2016 | Smith et al. | |
| 2008/0121119 A1 | 5/2008 | Routledge | |
| 2010/0236427 A1 | 9/2010 | Derscheid | |
| 2015/0373914 A1 | 12/2015 | Roberge | |
| 2016/0353664 A1 | 12/2016 | Weber et al. | |
| 2016/0355292 A1 | 12/2016 | Wigdahl et al. | |
| 2017/0332556 A1 | 11/2017 | Underhill | |
| 2019/0166769 A1 | 6/2019 | Little et al. | |

FOREIGN PATENT DOCUMENTS

| | | |
|---|---|---|
| EP | 1099367 A1 | 5/2001 |
| EP | 1129611 A2 | 9/2001 |
| EP | 1602269 A1 | 12/2005 |
| EP | 3566569 A2 | 11/2019 |

OTHER PUBLICATIONS

European Search Report issued in counterpart European Patent Application No. 19185221.9 dated Dec. 17, 2019 (9 pages).

* cited by examiner

BALER WITH NETWRAP ROLL LOADING DEVICE

FIELD OF THE INVENTION

The present disclosure relates to balers, and more specifically to a baler having a netwrap roll loading device.

BACKGROUND

During the baling process, finished bales are typically wrapped in a netwrap material to maintain the finished bail in the desired cylindrical or rectangular shape. The netwrap material used in this process is typically fed from individual netwrap rolls that, in turn, must be manually loaded into an elevated position for use. The loading process can be difficult given that the rolls typically weight upwards of 50 kg a piece and many times other equipment such as bale accumulators may be obstructing access to the loading site.

SUMMARY

In one aspect, a baler for use with a netwrap roll, the baler including a frame supported on one or more wheels, a housing coupled to the frame and at least partially defining a baling chamber therein, a netwrap assembly having a netwrap frame coupled to the housing and at least partially defining a netwrap chamber, and a loading device at least partially positioned within the netwrap chamber. Where the loading device includes a first frame fixed relative to the netwrap frame, a second frame movable relative to the first frame between a frame stowed position and a frame deployed position, a carriage movable relative to the second frame between a carriage stowed position and a carriage deployed position, and where the carriage is configured to support the netwrap roll.

In another aspect, a baler for use with a netwrap roll including a frame supported on one or more wheels, a housing coupled to the frame and at least partially defining a baling chamber therein, a netwrap cover movable with respect to the housing and at least partially defining a netwrap chamber therein, wherein the netwrap cover is movable relative to the housing between a closed position, in which the netwrap chamber is not accessible from the outside, and an open position, in which the netwrap chamber is accessible from the outside, a loading device with a carriage movable with respect to the housing between a stowed position, in which the carriage is completely positioned within the netwrap chamber, and a deployed position, in which at least a portion of the carriage is positioned outside the netwrap chamber, and where the carriage is configured to support at least one netwrap roll.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

Referring to FIGS. 1 and 3-11, a netwrap roll loading device 10 for use with a baler 14 having a netwrap assembly 42. The baler 14 is configured to collect crop material 18 from a support surface 22 (i.e., the field), process the crop material 18 into individual finished bales (not shown), wrap the finished bales with netwrap material 26 provided by a separate netwrap roll 46, and eject the finished and wrapped bales from the baler 14. In the illustrated implementation, the baler 14 includes a frame 30, a set of wheels 34 mounted on the frame 30, a housing 38 coupled to the frame 30, and the netwrap assembly 42 configured to store at least one netwrap roll 46 therein.

Figure 2:
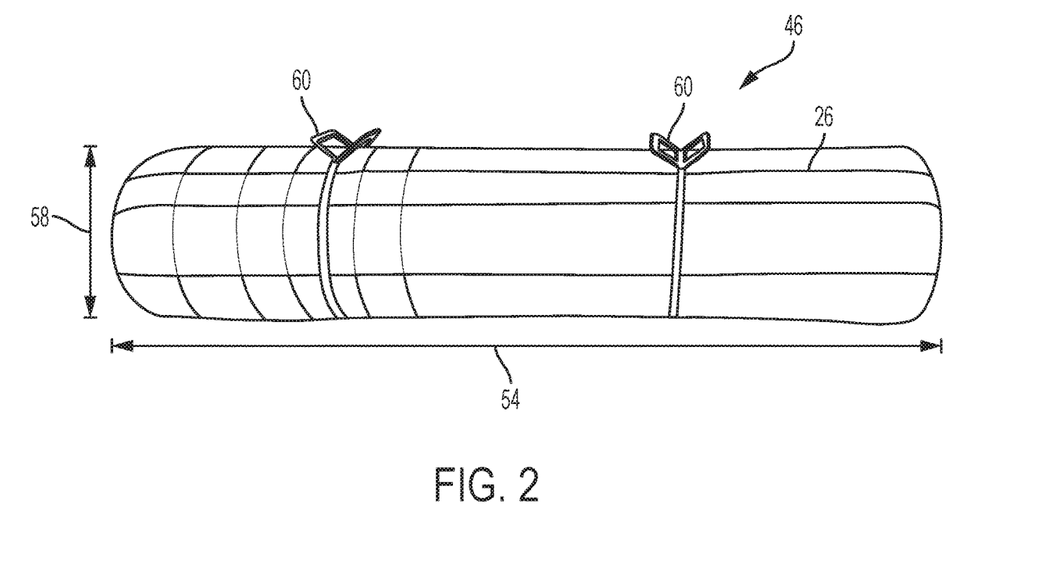
FIG. 2 is a front view of a netwrap roll.
Figure 3:
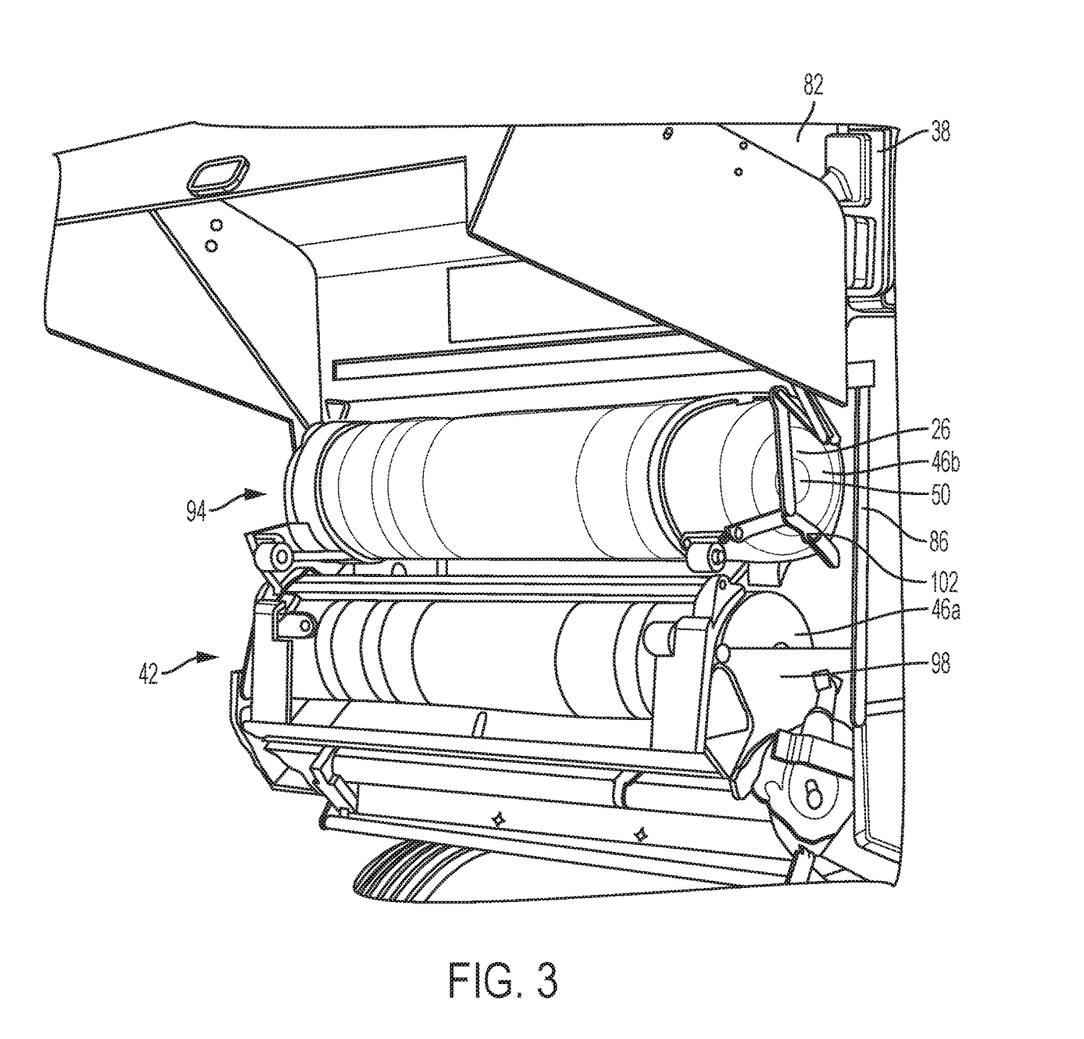
FIG. 3 is a rear perspective view of the baler of FIG. 1 with the netwrap door in the open position.

For the purposes of this application, each netwrap roll 46 includes a substantially cylindrical core 50 with a length of netwrap material 26 wrapped thereon. The netwrap roll 46 also defines an axial length 54 and an outer diameter 58. As shown in FIG. 2, the netwrap roll 46 may also include one or more removable handles 60 to aid the user when maneuvering the netwrap roll 46.

The frame 30 of the baler 14 is formed from one or more elongated members and includes a front end 62 generally in the form of a tow bar, and a rear end 66 opposite the front end 62. During use, the front end 62 of the frame 30 is connectable to a towing vehicle 64 such as an agricultural tractor and the like. The frame 30 of the baler 14 also defines a central axis 70 extending longitudinally therethrough and that is generally aligned with the direction of travel T of the baler 14 (see FIG. 1). The frame 30 also defines a vertical axis 74 oriented substantially perpendicular to the central axis 70 and substantially aligned with the force of gravity when the baler 14 is positioned on a substantially level surface.

The housing 38 of the baler 14 includes a forward covering 78 positioned proximate the front end 62 of the frame 30, and a rear door or crop package barrier 82 pivotably coupled to the forward covering 78 and positioned proximate the rear end 66 of the frame 30. Together, the forward covering 78 and rear door 82 at least partially define a baling chamber (not shown) configured to form a bale therein as is well known in the art. During use, the rear door 82 of the housing 38 is pivotable with respect to the forward covering 78 between a closed position (see FIG. 1), in which the rear door 82 encloses the baling chamber and restricts external access thereto, and an open position (not shown), in which the rear door 82 is pivoted away from the forward covering 78 allowing the baling chamber to be accessed from the outside. In the illustrated implementation, the rear door 82 is automatically pivotable relative to the forward covering 78 by a gate actuator (not shown) such as a hydraulic actuator, electrical actuator, and the like.

The baler 14 also includes a netwrap assembly 42 mounted to the housing 38 of the baler 14 and defining a netwrap chamber 94 therein. During use, the netwrap assembly 42 is configured to support at least one "primary" netwrap roll 46a within the netwrap chamber 94 whose netwrap material 26 is fed into the baling chamber for application onto a finished bale, and one or more "supplemental" netwrap rolls 46b within the netwrap chamber 94 for use after the primary netwrap roll 46 is depleted (see FIG. 3). In the illustrated implementation, the netwrap assembly 42 is configured to support one primary netwrap roll 46a and one supplemental netwrap roll 46b within the netwrap chamber 94.

Figure 4:
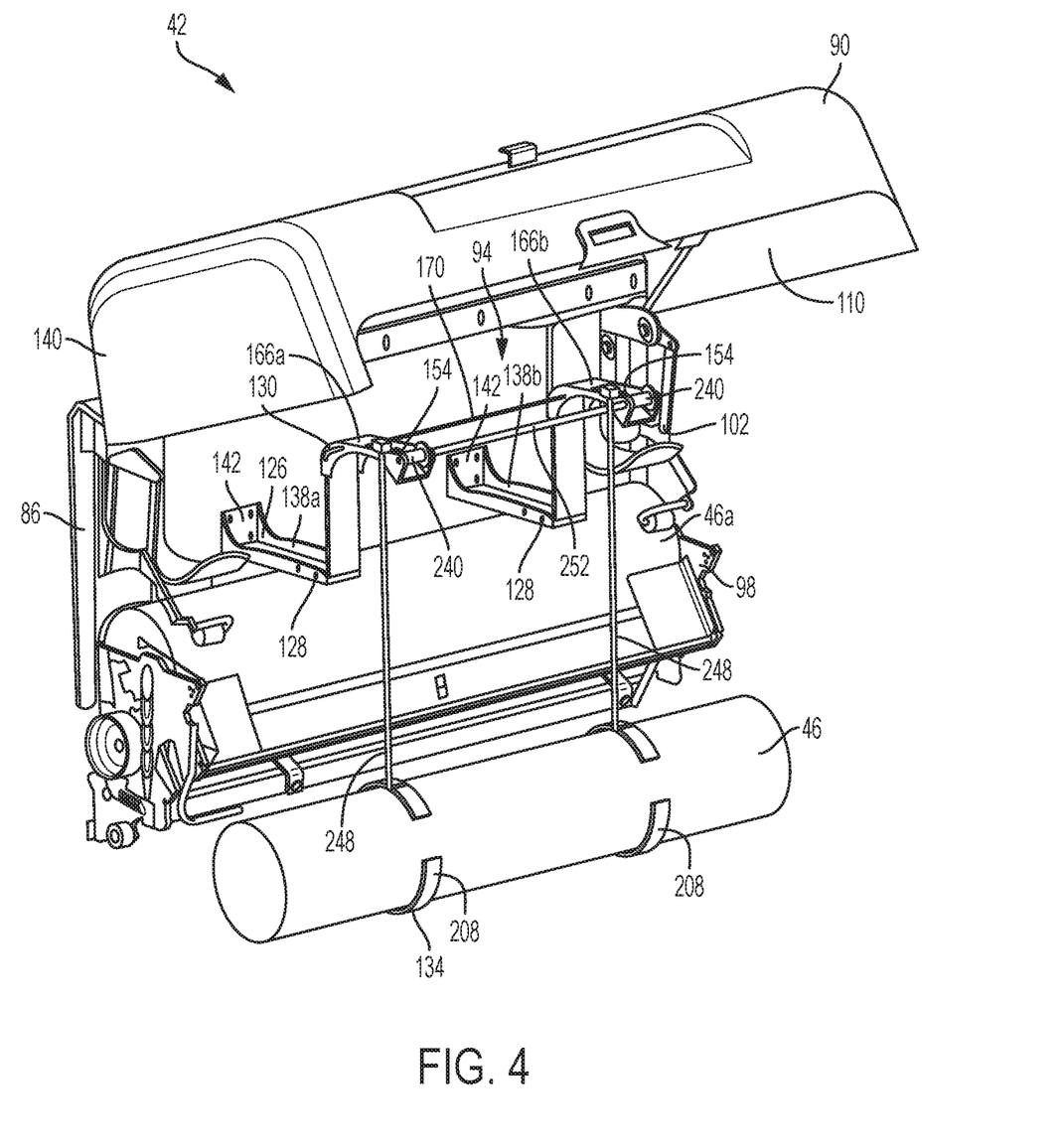
FIG. 4 is a perspective view of a netwrap assembly with the netwrap door in the open position and a loading assembly in the deployed position.

As shown in FIG. 4, the netwrap assembly 42 includes a netwrap frame 86 fixedly coupled to the housing 38, and a netwrap door 90 movably coupled to the netwrap frame 86 to at least partially define the netwrap chamber 94 therebetween. The netwrap assembly 42 also includes an operating assembly 98 at least partially positioned within the netwrap chamber 94, a storage assembly 102 at least partially positioned within the netwrap chamber 94, and the netwrap loading device 10. More specifically, the netwrap frame 86 is fixedly coupled to the rear door 82 of the housing 38 and defines a netwrap plane 100 that is substantially coincident therewith. In the illustrated implementation, the netwrap plane 100 has a substantially vertical orientation such that the netwrap plane 100 is substantially aligned with the direction of gravity G when the baler 14 is positioned on a generally level support surface 22 (see FIG. 6).

While the illustrated netwrap frame 86 is mounted to the rear door 66 of the housing 38, in alternative implementations the netwrap frame 86 may be mounted to any part of the baler 14 including, but not limited to, the forward covering 78, the frame 30, and the like. Still further, while the illustrated implementation includes a single netwrap assembly 42 that houses both the primary and supplemental netwrap rolls 46a, 46b, it is to be understood that the baler 14 may include multiple netwrap assemblies (not shown) configured to store and/or deploy netwrap rolls 46 as desired.

As shown in FIGS. 1 and 6-11, the netwrap door 90 of the netwrap assembly 42 is coupled to the netwrap frame 86 and movable with respect thereto between an open position (see FIG. 6), in which the netwrap chamber 94 is accessible from the outside, and a closed position (see FIG. 1), in which the netwrap chamber 94 is not accessible from the outside. For the purposes of this application, the netwrap chamber 94 is generally defined as the volume of space enclosed between the netwrap door 90 and netwrap frame 86 when the netwrap door 90 is in the closed position (see FIG. 6). In alternative implementations, the netwrap door 90 may be mounted directly to the housing 38 of the baler 14. In such implementations, the netwrap chamber 94 is generally defined as the volume of space enclosed between the netwrap door 90 and the housing 38.

In the illustrated implementation, the netwrap door 90 includes a substantially elongated body including an end wall 106, and a plurality of side walls 110 each extending from the end wall 106 to define an open end 114. Furthermore, the netwrap door 90 is pivotably coupled to the netwrap frame 86 such that the netwrap door 90 pivots between the open and closed positions. As such, when the netwrap door 90 is in the closed position (see FIG. 1), each of the plurality of side walls 110 is generally in contact with the netwrap frame 86 or housing 38 to enclose the netwrap chamber 94 therebetween. In contrast, when the netwrap door 90 is in the open position (see FIG. 6), the open end 114 of the door 90 is pivoted away from and out of engagement with the netwrap frame 86 and the housing 38. While the illustrated door 90 is pivotably coupled to the netwrap frame 86, it is to be understood that in alternative implementations that the door 90 may be linearly movable relative to the netwrap frame 86, include a series of connecting linkages, or even be completely removable therefrom.

Figure 6:
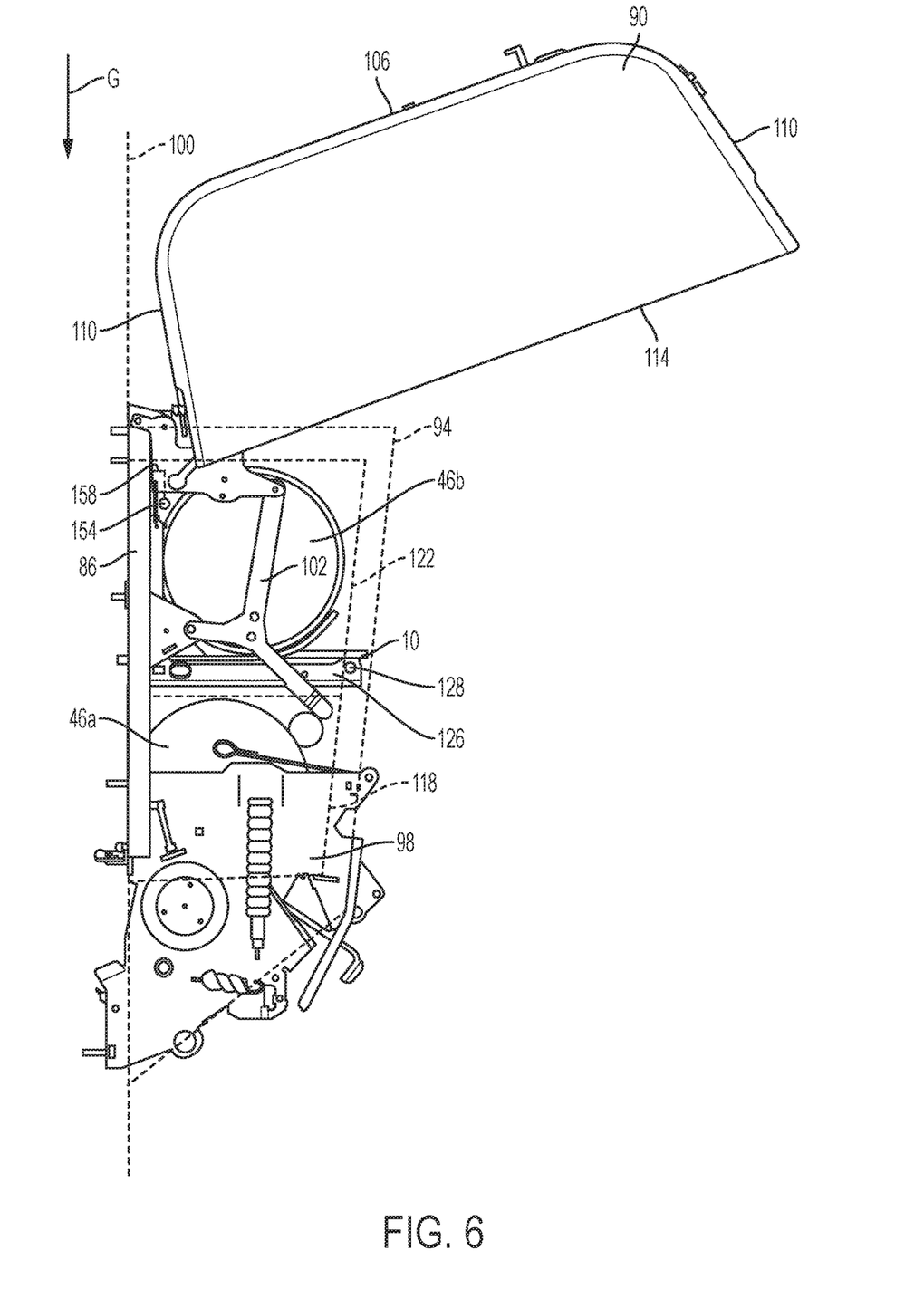
FIG. 6 is a side view of the netwrap assembly of FIG. 4 with the netwrap door in the open position and the loading assembly in the stowed position.

Illustrated in FIG. 6, the operating assembly 98 of the netwrap assembly 42 includes the associated machinery and linkages used to rotatably support the primary netwrap roll 46a within the netwrap chamber 94 and feed the netwrap material 26 located on the corresponding netwrap roll 46a into the baling chamber for application onto a finished bale as is well known in the art. The operating assembly 98 also defines an operating volume 118 generally defined as the volume of space occupied by a netwrap roll 46 when the roll 46 is being supported and manipulated by the operating assembly 98 (see FIG. 6).

Illustrated in FIG. 6, the storage assembly 102 of the netwrap assembly 42 includes the associated machinery and linkages used to support and store a supplemental netwrap roll 46b within the netwrap chamber 94 independent of the operating assembly 98. The storage assembly 102 also defines a storage volume 122 generally defined as the volume of space occupied by the supplemental netwrap roll 46b when stored by the storage assembly 102. In the illustrated implementation, at least a portion of the storage volume 122 of the storage assembly 102 is vertically aligned with the operating volume 118 of the operating assembly 98 such that an axis parallel with the vertical axis 74 can pass through both volumes 118, 122 simultaneously.

Referring to FIGS. 4-11, the loading assembly 10 of the netwrap assembly 42 includes a first frame 126 fixed relative to the netwrap frame 86, a second frame 130 pivotably coupled to the first frame 126, a carriage 134 movably coupled to the second frame 130, and a drive assembly 136 to maneuver the elements 126, 130, 134 of the loading assembly 10 with respect to one another. During use, the loading assembly 10 is configured to receive a netwrap roll 46 positioned outside the netwrap chamber 94 (e.g., positioned proximate the support surface 22; see FIG. 11) and convey the collected netwrap roll 46 into at least one of the storage volume 122 and the operating volume 118 of the netwrap assembly 42. More specifically, the loading assembly 10 is adjustable between a retracted position (see FIG. 6), in which the carriage 134 is positioned inside the netwrap chamber 94, and a deployed position (see FIGS. 8 and 11), in which the carriage 134 is positioned at least partially outside the netwrap chamber 94 and more accessible to the user. In the illustrated implementation, when the loading assembly 10 is in the retracted position, the carriage 134 is at least partially positioned within the storage volume 122 of the netwrap chamber 94.

While the illustrated loading assembly 10 is adjustable between a retracted position and a deployed position, it is to be understood that in alternative implementations the loading assembly 10 may include multiple deployed positions, each corresponding to a particular location to which the netwrap roll 46 is to be conveyed (e.g., proximate the support surface 22, the operating volume 118, the storage volume 122, and the like).

Figure 5:
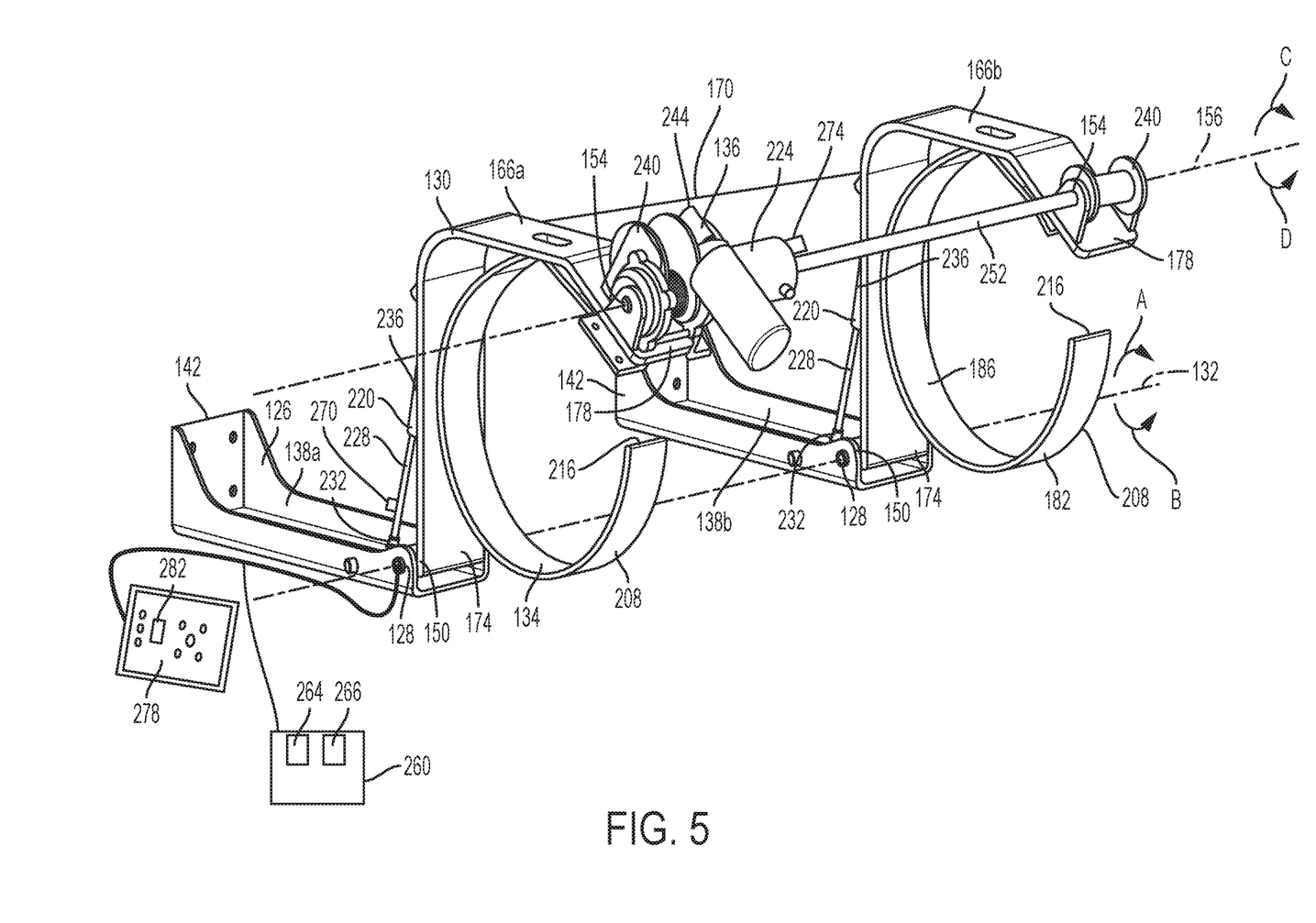
FIG. 5 is a perspective view of the loading assembly of FIG. 4.
Figure 7:
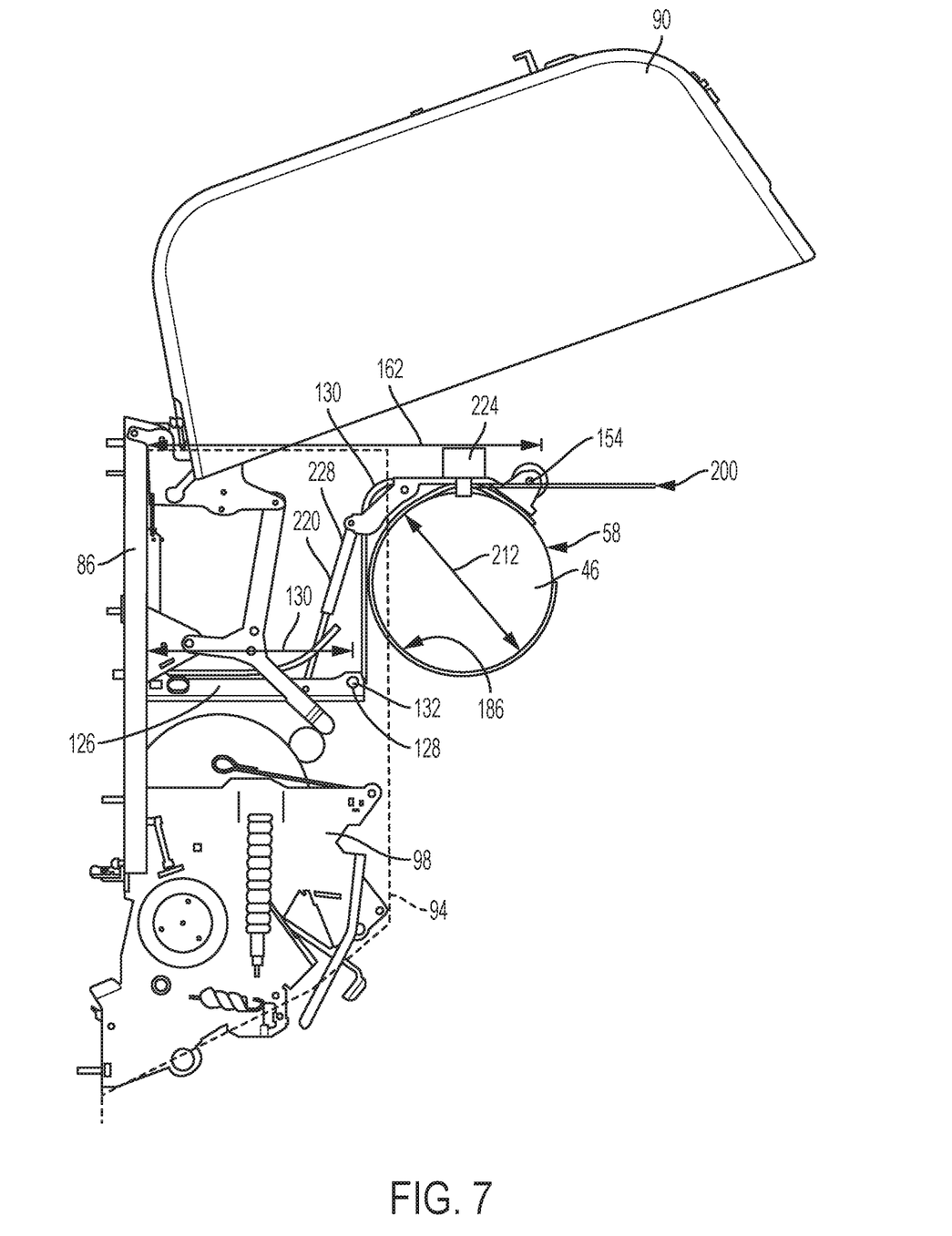
FIG. 7 is a side view of the netwrap assembly of FIG. 4 with the netwrap door in the open position and the second frame of the loading assembly in the deployed position.

Illustrated in FIGS. 4 and 5, the first frame 126 of the loading assembly 10 is fixed relative to the netwrap frame 86 and defines a pair of first mounting points 128 spaced a first mounting distance 130 from the netwrap plane 100 (see FIG. 7). Together, the first mounting points 128 of the first frame 126 define a first axis of rotation 132 that is substantially transverse to the central axis 70. In the illustrated implementation, the distance 130 between the netwrap frame 86 and the first mounting points 128 generally corresponds to at least one of the width of the storage volume 122 and the operating volume 118. As such, the first distance 130 is generally equal to or larger than the outer diameter 58 of a netwrap roll 46 intended to be stored therein.

The first frame 126 of the loading assembly 10 includes a pair of elongated members 138a, 138b each having a first end 142 fixedly coupled to the netwrap frame 86, and a second end 146 opposite the first end 142 that forms a corresponding one of the first mounting points 128. More specifically, each elongated member 138a, 138b of the first frame 126 extends outwardly (i.e., rearwardly) from the housing 38 of the baler 14 in a direction substantially parallel to the central axis 70.

The second frame 130 of the loading assembly 10 includes a pair of second mounting points 150, each pivotably coupled to a corresponding first mounting point 128 of the first frame 126. The second frame 130 also includes a pair of third mounting points 154, each spaced a distance from the second mounting points 150 and defining a second axis 156 that is substantially parallel to the first axis 132. During use, the second frame 130 is pivotable relative to the first frame 126 about the first axis 132 between a stowed position (see FIG. 6), in which the pair of third mounting points 154 (i.e., the second axis 156) are spaced a first distance 158 from the netwrap plane 100, and a deployed position (see FIG. 7), in which the pair of third mounting points 154 (i.e., the second axis 156) are spaced a second distance 162 from the netwrap plane 100 that is greater than the first distance 158. More specifically, when the second frame 130 is in the stowed position, the pair of third mounting points 154 are positioned axially between the pair of first mounting points 128 (i.e., the first axis 132) and the netwrap plane 100 (e.g., the first distance 158 is less than the first mounting distance 130). In contrast, the pair of third mounting points 154 are positioned axially further away from the netwrap frame 86 than the pair of first mounting points 128 when the second frame 130 is in the deployed position (e.g., the second distance 162 is greater than the first mounting distance 130).

Figure 11:
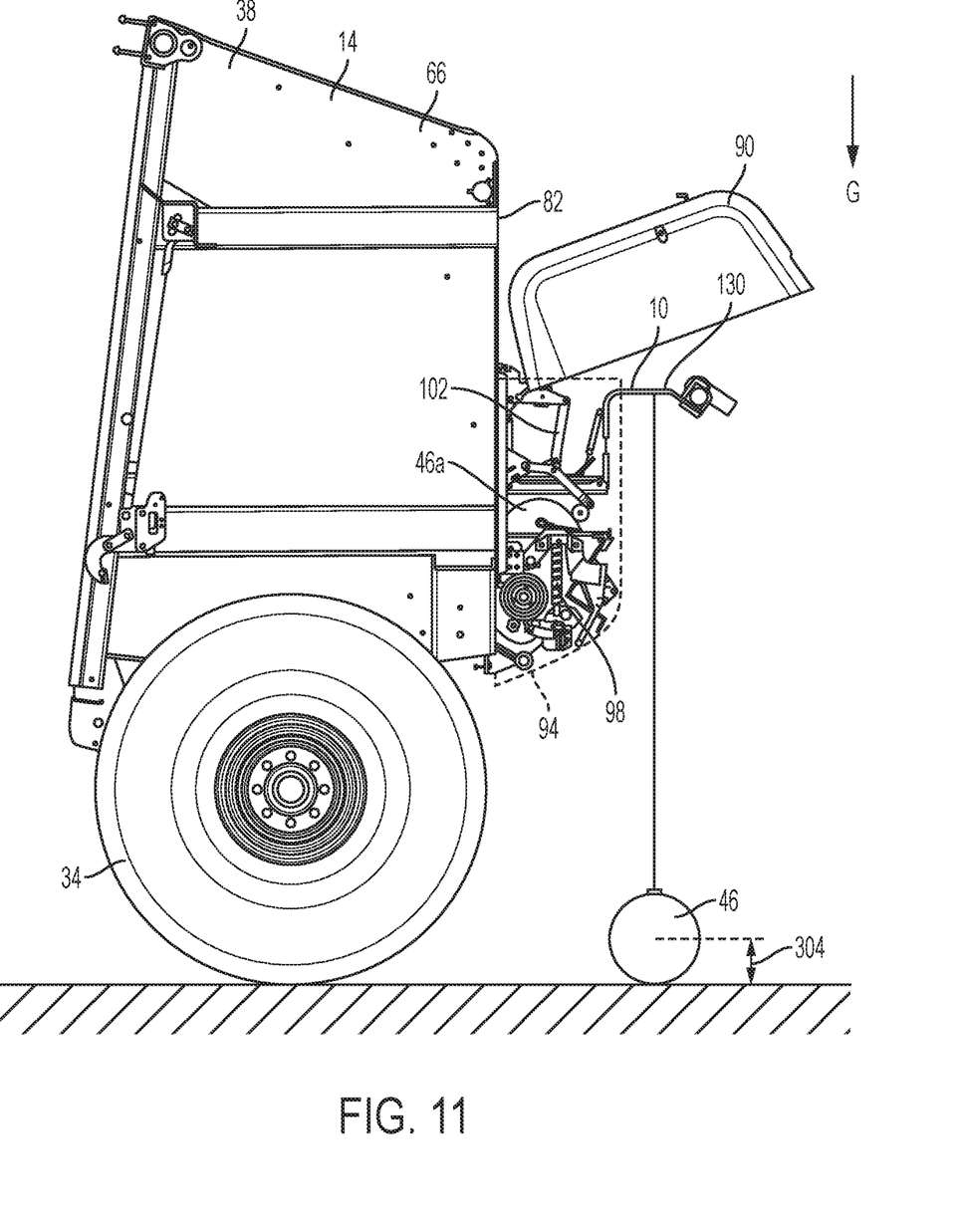
FIG. 11 is a side view of the baler of FIG. 9 with the loading assembly in one deployed position.

As shown in FIGS. 7 and 11, the second distance 162 of the second frame 130 is sufficiently large so that the pair of third mounting points 154 are clear of any obstructions positioned between the mounting points 154 and the support surface 22 in a generally vertical orientation (e.g., generally aligned with the vertical axis 74). While the illustrated implementation only includes the operating assembly 98 as a potential obstruction, in alternative implementations such obstructions may include, but are not limited to, a bale accumulator, a trailer, and the like. In such alternative implementations, the second distance 162 is sufficiently large to avoid any obstructions that would hamper the carriage ability to travel vertically between the support surface 22 and the second frame 130 when the second frame 130 is in the deployed position.

In the illustrated implementation, the second frame 130 of the loading assembly 10 includes a pair of support arms 166a, 166b and one or more cross-members 170 extending between and coupled to both support arms 166a, 166b causing the support arms 166a, 166b and cross-members 170 to move together as a unit. As shown in FIG. 5, each support arm 166a, 166b of the second frame 130 is substantially "L-shaped" having a first end 174 defining a corresponding one of the pair of second mounting points 150, and a second end 178 opposite the first end 174 defining a corresponding one of the pair of third mounting points 154. When assembled, the second mounting points 150 of each arm 166a, 166b are pivotably coupled to a corresponding first mounting point 128 of the first frame 126. As such, pivoting the second frame 130 about the resulting joint (e.g., about the first axis 132) causes the third mounting points 154 to travel in a substantially arcuate path between the stowed position and the deployed position.

Illustrated in FIG. 5, the carriage 134 of the loading assembly 10 includes a body 182 at least partially defining a storage position 186 that is sized and shaped to receive at least a portion of a netwrap roll 46 therein. During use, the carriage 134 of the loading assembly 10 is movable relative to the second frame 130 between a retracted position (see FIG. 7), in which the carriage 134 is a first distance 200 from the second axis 156, and an extended position (see FIG. 8), in which the carriage 134 is a second distance 204 from the second axis 156 that is greater than the first distance 200.

Figure 8:
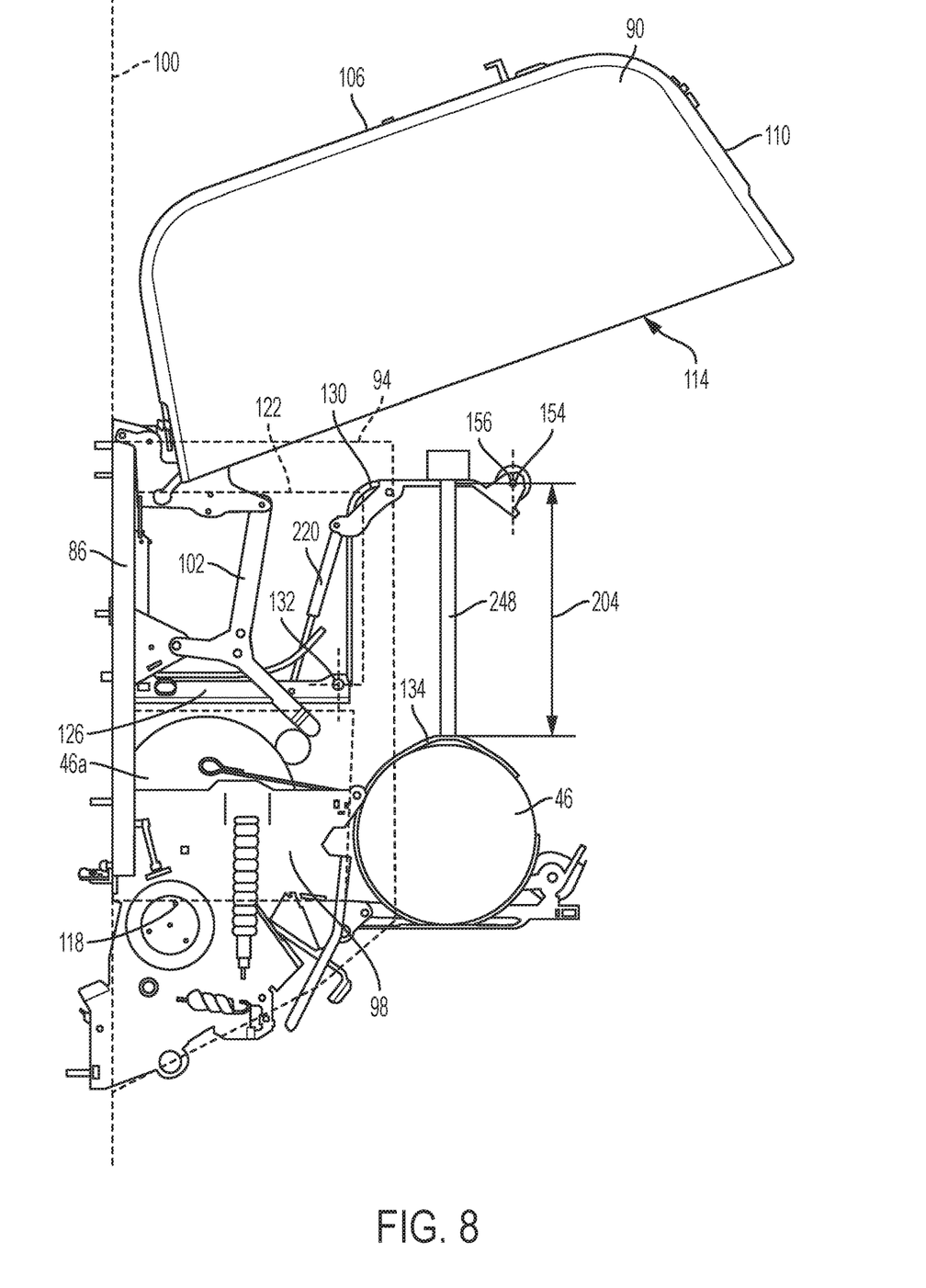
FIG. 8 is a side view of the netwrap assembly of FIG. 4 with the netwrap door in the open position and the loading assembly in the deployed position.
Figure 9:
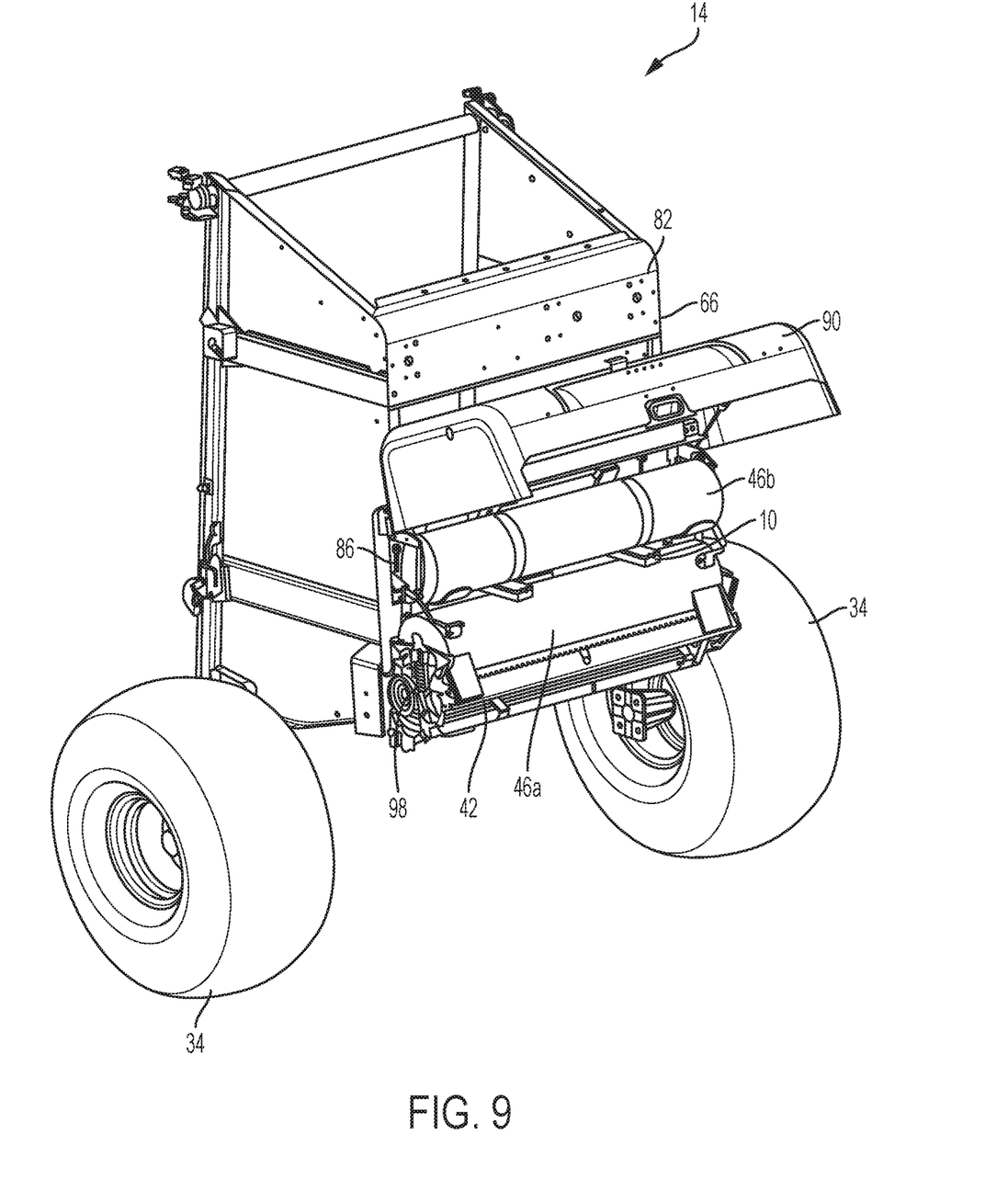
FIG. 9 is a perspective view of the netwrap assembly of FIG. 4 mounted to a baler.
Figure 10:
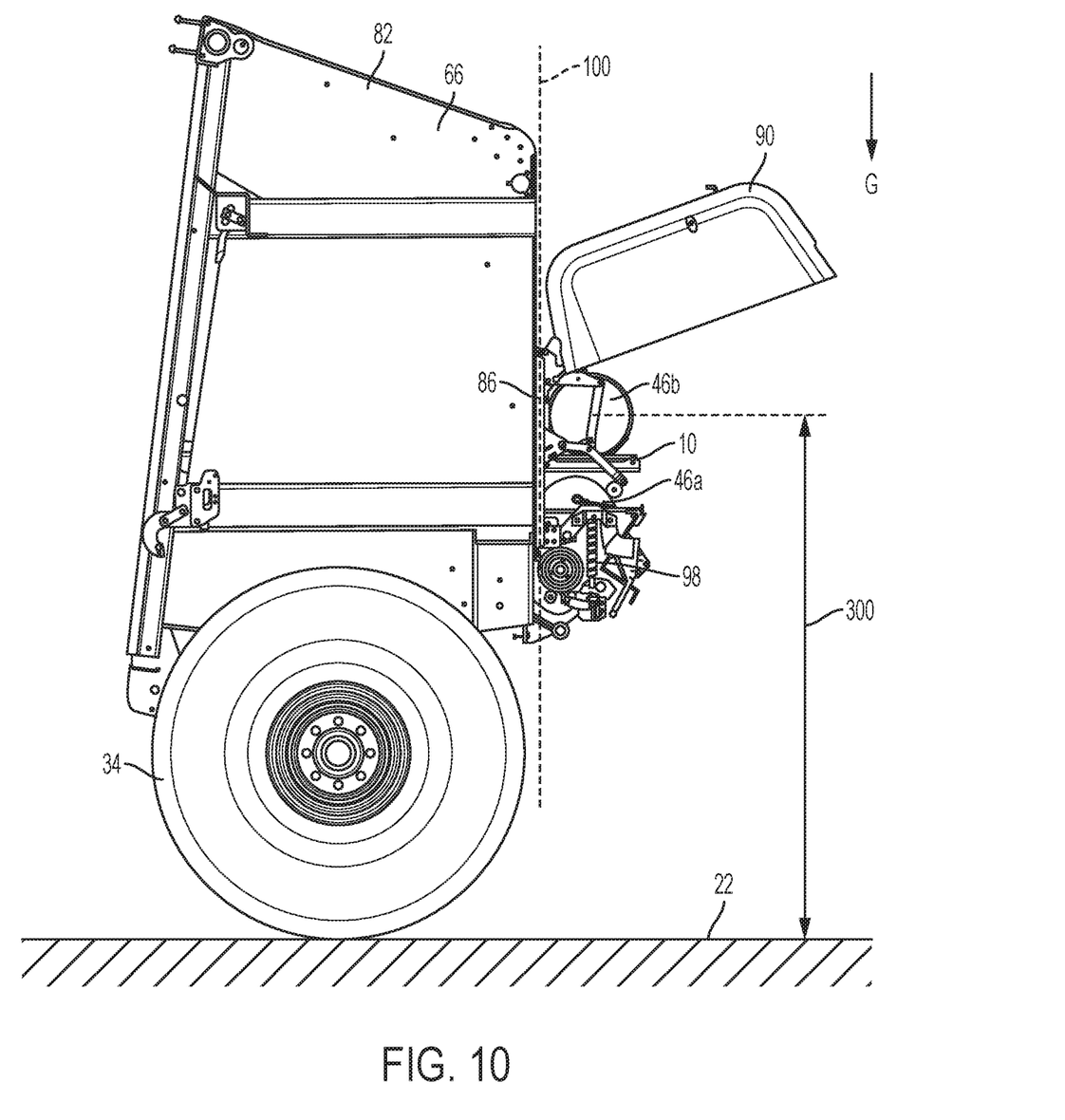
FIG. 10 is a side view of the baler of FIG. 9 with the loading assembly in the retracted position.

As shown in FIGS. 8 and 11, the carriage 134 is configured to move linearly with respect to the second frame 130 along a substantially vertical path between the stowed and deployed positions. As such, the carriage 134 is a first vertical distance 300 from the support surface 22 in the stowed position, and a second vertical distance 304 from the support surface 22 that is less than the first vertical distance 300 in the deployed position. While the illustrated implementation illustrates the deployed position of the carriage 134 proximate the support surface 22 (e.g., with a second vertical distance 304 close to zero), it is to be understood that the deployed position may be set to any vertical distance corresponding to the loading surface being used (e.g., aligned with a bench, a loading dock, a pallet, and the like). In still other implementations, the carriage 134 may have multiple deployed positions, each having a unique vertical height from the support surface 22.

In the illustrated implementation, the body 182 of the carriage 134 includes a plurality of support rings 208, each being substantially annular in shape and defining an inner diameter 212 that substantially corresponds to the outer diameter 58 of the netwrap rolls 46 (see FIGS. 5 and 7). During use, the user axially inserts a netwrap roll 46 into the storage position 186 of the carriage 134 by passing the netwrap roll 46 axially through each of the plurality of rings 208 (see FIG. 4). Once inserted, the netwrap roll 46 and carriage 134 move together as a unit.

As shown in FIG. 5, each ring 208 of the carriage 134 includes a gap 216 formed therein to allow the inner diameter 212 of the rings 208 to vary and compensate for changes in the netwrap roll's outer diameter 58. Still further, the gaps 216 are also sized and shaped to allow the handles 60 of the netwrap roll 46 to pass axially therethrough. As such, when a user inserts the netwrap roll 46 into the storage location 186, the user does not need to remove his hands from the handles 60 for the entire process. In alternative implementations, the carriage 134 may include alternative designs, shapes, or mechanisms to releasably support at least a portion of a netwrap roll 46 therein.

Illustrated in FIG. 5, the drive assembly 136 of the loading assembly 10 includes a first actuator assembly 220 in operable communication with and extending between the first frame 126 and the second frame 130, and a second actuator assembly 224 in operable communication with and extending between the second frame 130 and the carriage 134. Together, the first actuator assembly 220 and the second actuator assembly 224 are configured to actively adjust the loading assembly 10 between the stowed configuration and the deployed configuration.

The first actuator assembly 220 of the drive assembly 10 includes a plurality of actuators 228, each having a first end 232 and a second end 236 movable with respect to the first end 232 to define an actuator distance 230 therebetween. Once assembled, one of the first end 232 and the second end 236 of the actuators 228 are coupled to the first frame 126 while the other of the first end 232 and the second end 236 are coupled to the second frame 130. During use, adjusting the actuator distance 230 of the actuators 228 cause the second frame 130 to pivot relative to the first frame 126 about the first axis 132 (e.g., at the joint created between the first mounting points 128 and the second mounting points 150). More specifically, increasing the actuator distance 230 causes the second frame 130 to pivot toward the deployed position (e.g., in direction A) while reducing the actuator distance 230 causes the second frame 130 to pivot toward the stowed position (e.g., in direction B that is opposite to direction A). In the illustrated implementation, each actuator 228 of the first actuator assembly 220 includes a gas spring. However, in alternative implementations, alternative forms of actuation may be used including, but not limited to, a hydraulic cylinder, a gear train, an electric linear actuator, a pneumatic cylinder, biasing members, and the like.

The second actuator assembly 224 of the drive assembly 10 includes a pair of pulleys 240 each rotatably mounted to a respective one of the third mounting points 154 of the second frame 130, a drive motor 244 in operable communication with and configured to drive the pulleys 240, and a pair of cables 248 each extending between and coupled to a respective pulley 240 and the carriage 134. During use, rotating the pulleys 240 about the second axis 156 causes the carriage 134 to move relative to the second frame 130 between the retracted position and the extended position (described above). More specifically, rotating the pulleys 240 in a first direction C causes the corresponding cables 248 to coil onto the pulleys 240 and shorten the uncoiled length thereof. As such, rotating the pulleys 240 in a first direction C causes the carriage 134 to move toward the second frame 130 and the stowed position. In contrast, rotating the pulleys 240 in a second direction D, opposite the first direction C, causes the corresponding cables 248 to uncoil and increase the uncoiled length thereof. As such, rotating the pulleys 240 in the second direction D causes the carriage 134 to move away from the second frame 130 and toward the extended position. In the illustrated implementation, the both pulleys 240 are mounted onto a common shaft 252 such that both pulleys 240 rotate together as a unit. This configuration allows the cables 248 to be wound and unwound from the pulleys 240 together assuring the orientation of the carriage 134 relative to the second axis 156 remains constant.

Illustrated in FIG. 5, the loading assembly 10 also includes a controller 260 configured to direct and control the operation of the loading assembly 10 during use. The controller 260 includes a processor 264, a memory unit 266 in operable communication with the processor 264, and one or more sensors 270, 274 sending and receiving signals from the processor 264. The processor 264 is also in operable communication with one or more elements of the baler 14 such as, but not limited to, the first actuator assembly 220, the second actuator assembly 224, and a user interface 278. During use, the controller 260 receives one or more signals from the user interface 278 and the one or more sensors 270, 274, inputs the received information into one or more control algorithms, and outputs signals to the first actuation assembly 220 and the second actuation assembly 224 to control the movement of the carrier 134 relative to the baler housing 38. More specifically, the processor 264 of the controller 260 is configured to send signals to the first actuation assembly 220 and the second actuation assembly 224 to adjust the loading device 10 between the stowed configuration (see FIGS. 6 and 9) and the deployed configuration (see FIGS. 8 and 11).

The one or more sensors 270, 274 of the controller 260 are positioned throughout the baler 14 and configured to provide information regarding the operation and status of the loading device 10. In particular, the controller 260 includes a first position sensor 270 configured to detect the relative position of the second frame 130 with respect to the first frame 126, and a second position sensor 274 configured to detect the relative position of the carriage 134 with respect to the second frame 130. The sensors 270, 274 may be present individually, in plurality, or in combination.

The user interface 278 of the controller 260 is configured to provide and receive information from the user. As shown in FIG. 5, the user interface 278 includes a remote unit in operable communication with the processor 264 and having one or more screens 282 to provide information to the user, and one or more inputs (e.g., buttons, touchscreens, and the like) to receive inputs and data from the user. In alternative implementations, the user interface 278 may be integrated into the cab of the towing vehicle 64 or fixedly mounted to the housing 38 of the baler 14.

Figure 1:
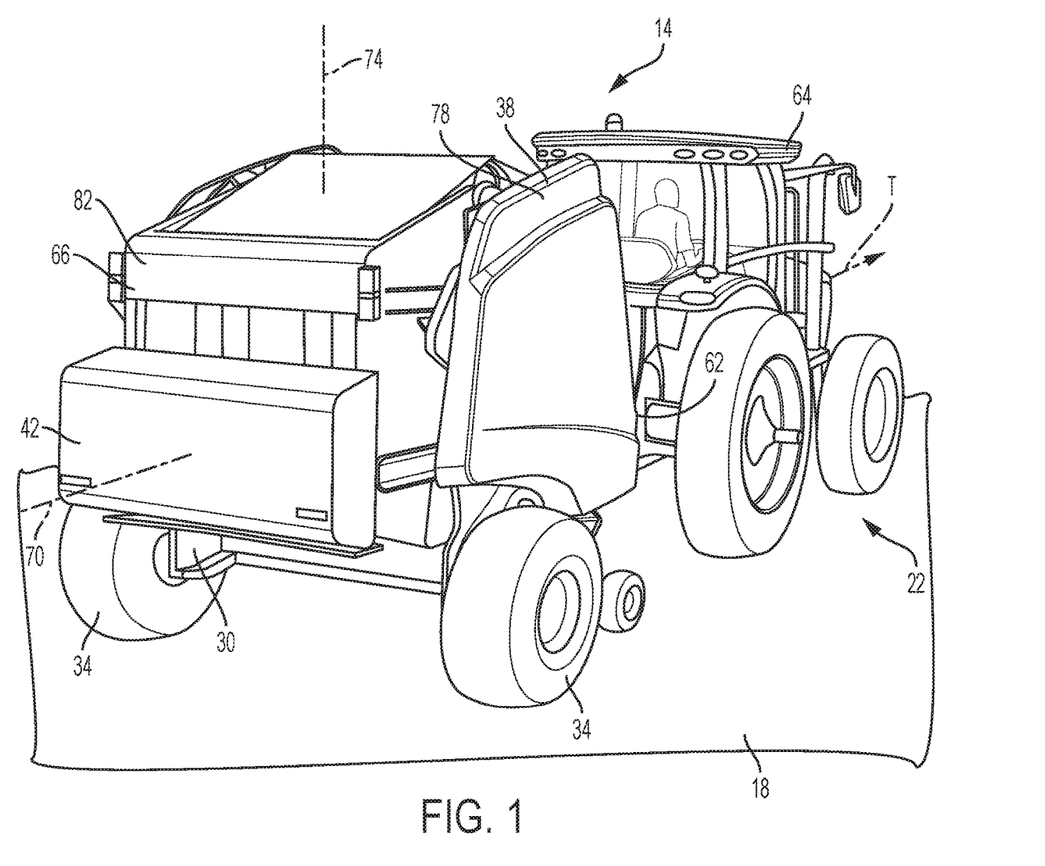
FIG. 1 is a rear perspective view of a baler mounted to a tow vehicle.

During baling operations, the netwrap assembly 42 is typically stored with the loading assembly 10 in the stowed configuration and the netwrap door 90 in the closed position (see FIG. 1).

To load a netwrap roll 46 into the netwrap assembly 42, the user pivots the netwrap door 90 from the closed position (see FIG. 1) into the open position (see FIG. 3) to allow exterior access to the netwrap chamber 94. In implementations where a powered netwrap door 90 is present (e.g., an actuator is used), the user may command the netwrap door 90 to open by entering the necessary inputs into the user interface 278. In manually operated implementations, the user may manually pivot the netwrap door 90 between the open and closed positions.

With the netwrap door 90 in the open position, the user may then instruct the loading assembly 10 to move to the deployed configuration. To do so, the user enters the necessary inputs into the user interface 278 instructing the processor 264 to begin the deployment process. With the process initiated, the processor 264 sends signals to the first actuator assembly 220 instructing both actuators 228 to increase in length. As the actuator lengths 230 increase, the second frame 130 pivots about the first axis 132 relative to the first frame 126 in the first direction A and toward the deployed position. Simultaneously, the first position sensor 270 sends a continuous stream of signals to the processor 264 representative of the current angular position of the second frame 130.

Once the second frame 130 reaches the deployed position (see FIG. 7), the processor 264 receives a corresponding signal from the first position sensor 270 representing the frame's position. The processor 264 then processes the signal and instructs the actuators 228 to stop, maintaining the second frame 130 in the deployed position.

With the second frame 130 in the upright position, the processor 264 then outputs signals to the second actuator assembly 224 instructing the drive motor 244 to rotate the pulleys 240 in the second direction D. As described above, rotating the pulleys 240 in the second direction D causes the cables 248 are unwind therefrom increasing the cable's unwound length. This action, in turn, increases the distance between the carriage 134 and the second frame 130 and causes the vertical height of the carriage 134 to decrease. Simultaneously, the second position sensor 274 sends a continuous stream of signals to the processor 264 representative of the current distance between the second frame 130 and the carriage 134.

Once the carriage 134 reaches the deployed position, the processor 264 receives a corresponding signal from the second position sensor 274 representing the carriage's position. The processor 264 then processes the signal and instructs the drive motor 244 to stop, maintaining the carriage 134 in the deployed position and placing the loading assembly 10 in the deployed configuration overall. In some implementations, the user may then adjust the position of the carriage 134 (e.g., increasing or decreasing its vertical height 300) by entering the necessary inputs into the user interface 278.

With the loading assembly 10 in the deployed configuration, the user may then load a netwrap roll 46 into the storage position 186 of the carriage 134. To do so, the user axially passes the roll 46 through each of the rings 208 of the carriage 134. Due to the carriage's relatively low position proximate the support surface 22, the user can load the netwrap roll 46 into the carriage 134 with minimal stress and effort.

Once the netwrap roll 46 is loaded into the storage position 186 of the carriage 134, the user may then instruct the loading assembly 10 to return to the stowed configuration. To do so, the user enters the necessary inputs into the user interface 278 instructing the processor 264 to begin the stowing process. While the illustrate implementation indicates that the stowing process may be initiated by inputs from the user, in alternative implementations the stowing process may be initiated by other information including, but not limited to, the detection of a certain amount of weight in the carriage 134, the tension within the cables 248 exceed a predetermined amount, a certain period of time has passed, and the like.

With the process initiated, the processor 264 sends signals to the second actuator assembly 224 instructing the drive motor 244 to rotate the pulleys 240 in the first direction C. As described above, rotating the pulleys 240 in the first direction C causes the cables 248 to wind onto the pulleys 240 decreasing the cable's unwound length. This action, in turn, decreases the distance between the carriage 134 and the second frame 130 and causes the vertical height 300 of the carriage 134 to increase. Simultaneously, the second position sensor 274 sends a continuous stream of signals to the processor 264 representative of the current distance between the second frame 130 and the carriage 134.

Once the carriage 134 reaches the stowed position (see FIG. 7), the processor 264 receives a corresponding signal from the second position sensor 274 representing the carriage's position. The processor 264 then processes the signal and instructs the drive motor 244 to stop, maintaining the carriage 134 in the stowed position.

With the carriage 134 stowed, the processor 264 then outputs signals to the first actuator assembly 220 instructing both actuators 228 to decrease in length. As the actuator lengths 230 decrease, the second frame 130 pivots about the first axis 132 relative to the first frame 126 in the second direction B and toward the stowed position. Simultaneously, the first position sensor 270 sends a stream of continuous signals to the processor 264 representative of the current angular position of the second frame 130.

Once the second frame 130 reaches the stowed position (see FIGS. 6 and 9), the processor 264 receives a corresponding signal from the first position sensor 270 representing the frame's position. The processor 264 then processes the signal and instructs the actuators 228 to stop, maintaining the second frame 130 in the stowed position and placing the loading assembly 10 in the stowed configuration overall. As shown in FIG. 6, the stowed configuration of the illustrated implementation corresponds with placing the netwrap bale 46 in the storage volume 122 of the netwrap chamber 94. However, in alternative implementations, the loading assembly 10 may be configured to position the netwrap bale 46 in the processing volume 118. In still other implementations, the user may be able to elect on the user interface 278 where the netwrap roll 46 is stored.

With the netwrap roll 46 stored and the loading assembly 10 in the stowed configuration, the user may then pivotably return the netwrap door 90 to the closed position and resume baling operations.

Figure 12:
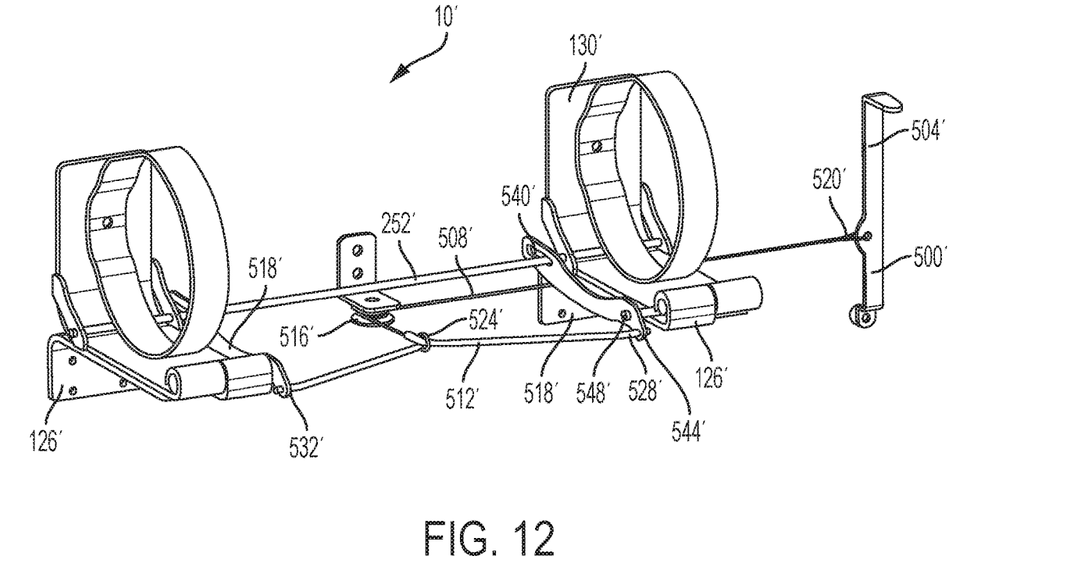
FIG. 12 is a perspective view of another implementation of a loading assembly.
Figure 13:
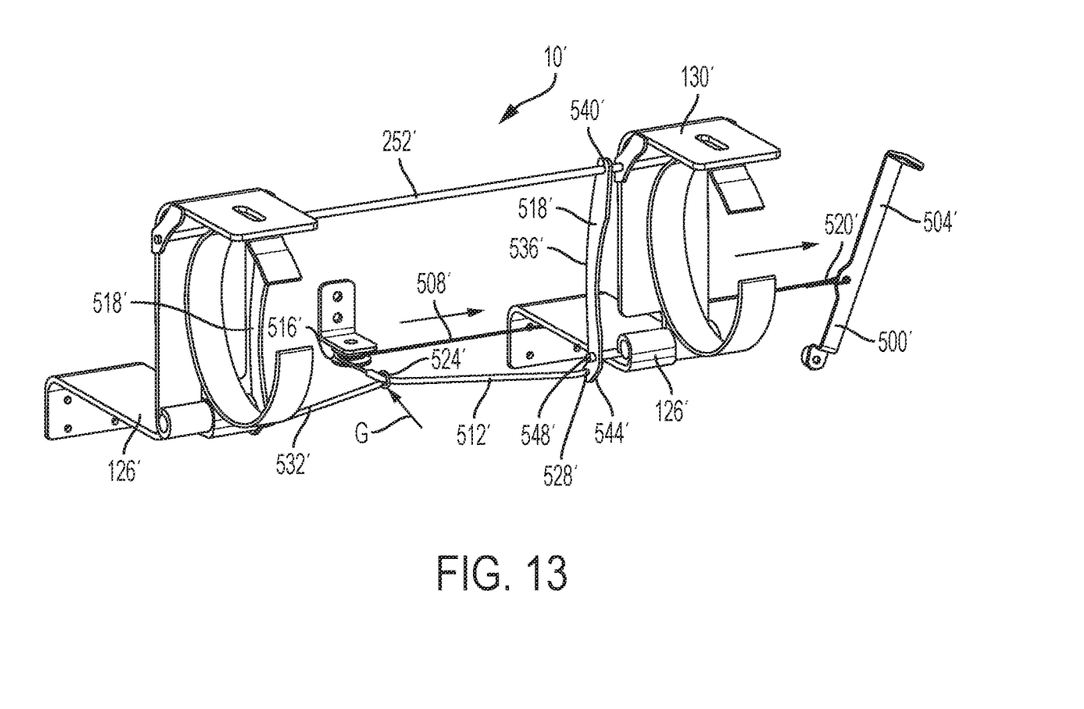
FIG. 13 is a perspective view of the loading assembly of FIG. 12 with the second frame in a deployed position.

FIGS. 12-13 illustrate another implementation of the loading assembly 10'. The loading assembly 10' is substantially similar to the loading assembly 10 illustrated in FIGS. 1-11. As such, only the differences will be discussed herein. All similar features have been given the same reference number with an added prime symbol.

The loading assembly 10' includes a manual actuator assembly 500' configured to move the second frame 130' between the stowed position (see FIG. 12) and the deployed position (see FIG. 13). The manual actuator assembly 500' includes a handle 504' pivotably coupled to the housing 38' and accessible outside the netwrap chamber 98', a primary cable 508', a secondary cable 512', and one or more pulleys 516' to direct the cables 508', 512' during use. The actuator assembly 500' also includes a pair of elongated members 518' pivotably coupled to the first frame 126' and rotatable together with the second frame 130' during use.

The primary cable 508' of the actuator assembly 500' includes a first end 520' coupled to the handle 504', and a second end 524' opposite the first end 520'. In the illustrated implementation, the second end 524' of the primary cable 508' forms a loop.

The secondary cable 512' of the actuator assembly 500' includes a first end 528' coupled to one of the two elongated members 518', and a second end 532' opposite the first end 538' that is coupled to the other of the two elongated member 518'. In the illustrated implementation, the body of the cable 512' extends through the loop formed by the second end 524' of the primary cable 508'.

Each of the elongated members 518' include a body 536' having a first end 540', a second end 544' opposite the first end 540', and a pivot point 548' positioned between the first end 540' and the second end 544'. When assembled, the first end 540' of each elongated member 518' is coupled to the cross-member 252' of the second frame 130' proximate one of the arms 166a', 166b'. Furthermore, the second ends 544' of the elongated members 518' are coupled to the first end 528' and the second end 532' of the secondary cable 512', respectively.

To manually move the second frame 130' from the stowed position to the deployed position, the user grasps the handle 504' and pivots it with respect to the housing 28' of the baler 14'. The pivoting motion of the handle 504', in turn, pulls on the first end 520' of the primary cable 508' which causes the second end 524' of the primary cable 508' to move in the first direction G.

As the second end 524' of the primary cable 508' moves in the first direction G, the looped end pulls on the body of the secondary cable 512' causing the first end 528' and the second end 532' thereof to move inwardly toward one another and also move in the first direction G. This force, is transmitted to the second ends 544' of the elongated members 518' which cause the elongated members to rotate about their corresponding pivot points 548'. This motion, in turn, is transmitted to the second frame 130' which causes the frame 130' to pivot from the stowed position (see FIG. 12) into the deployed position (see FIG. 13).

To return the second frame 130' to the stowed position, the user releases the handle 504', which allows the system to go slack and allows the second frame 130' to pivot back into the stowed position (see FIG. 12).

What is claimed is:

1. A baler for use with a netwrap roll, the baler comprising:
    a frame supported on one or more wheels;
    a housing coupled to the frame and at least partially defining a baling chamber therein;
    a netwrap assembly having a netwrap frame coupled to the housing and at least partially defining a netwrap chamber; and
    a loading device at least partially positioned within the netwrap chamber, wherein the loading device includes:
        a first frame fixed relative to the netwrap frame,
        a second frame movable relative to the first frame between a frame stowed position and a frame deployed position, and
        a carriage movable relative to the second frame between a carriage stowed position and a carriage deployed position, and wherein the carriage is configured to support the netwrap roll; and
    wherein the carriage is a first distance from the second frame when the carriage is in the carriage stowed position, and wherein the carriage is a second distance from the second frame greater than the first distance when the carriage is in the carriage deployed position.

2. The baler of claim 1, wherein the carriage moves between the carriage stowed position and the carriage deployed position when the second frame is in the frame deployed position.

3. The baler of claim 1, wherein carriage is coupled to the second frame via a cable.

4. The baler of claim 3, wherein the second frame includes a pulley rotatably coupled thereto, and wherein the cable is at least partially wound about the pulley.

5. The baler of claim 4, wherein winding and unwinding the cable onto and off of the pulley causes the carriage to move between the carriage stowed position and the carriage deployed position.

6. The baler of claim 3, further comprising an actuator assembly extending between and coupled to the second frame and the carriage, and wherein the actuator is configured to adjust the carriage between the carriage stowed position and the carriage deployed position based at least in part on the tension in the cable.

7. The baler of claim 1, wherein the carriage includes one or more rings sized to receive at least a portion of the netwrap roll therein.

8. The baler of claim 1, wherein the second frame is pivotably coupled to the first frame.

9. The baler of claim 1, further comprising an actuator coupled to and extending between the first frame and the second frame, wherein the actuator defines an actuator length, and wherein changing the actuator length causes the second frame to move between the frame stowed position and the frame deployed position.

10. The baler of claim 1, wherein the carriage is coupled to the second frame at a mounting point, and wherein the mounting point is a first distance from the netwrap frame when the second frame is in the frame stowed position, and wherein the mounting point is a second distance from the netwrap frame greater than the first distance when the second frame is in the frame deployed position.

11. The baler of claim 10, wherein the carriage moves between the carriage deployed position and the carriage stowed position when the second frame is in the frame deployed position.

12. A baler for use with a netwrap roll comprising:
    a frame supported on one or more wheels, wherein the wheels define a support surface;
    a housing coupled to the frame and at least partially defining a baling chamber therein;
    a netwrap cover movable with respect to the housing and at least partially defining a netwrap chamber therein, wherein the netwrap cover is movable relative to the housing between a closed position, in which the netwrap chamber is not accessible from the outside, and an open position, in which the netwrap chamber is accessible from the outside; and
    a loading device with a carriage movable with respect to the housing between a stowed position, in which the carriage is completely positioned within the netwrap chamber, a first deployed position, in which at least a portion of the carriage is positioned outside the netwrap chamber and spaced a first vertical distance from the support surface, and a second deployed position, in which at least a portion of the carriage is positioned outside the netwrap chamber and spaced a second vertical distance from the support surface different than the first vertical distance, and wherein the carriage is configured to support at least one netwrap roll.

13. The baler of claim 12, further comprising an operating assembly at least partially positioned within the netwrap chamber, and wherein the operating assembly defines an operating volume.

14. The baler of claim 13, wherein the carriage of the loading device is at least partially vertically aligned with the operating volume when the carriage is in the stowed position.

15. The baler of claim 12, wherein the loading device includes a first frame fixedly coupled to the housing, a second frame pivotably coupled to the first frame, and wherein the carriage is movable relative to the second frame.

16. The baler of claim 12, wherein the carriage includes one or more rings sized to receive at least a portion of the corresponding netwrap roll therein.

17. The baler of claim 12, further comprising a controller in operable communication with the loading device, and wherein the controller is configured to move the carriage between the stowed position and the first deployed positioned, and the second deployed position based at least in part on the external forces applied to the carriage.

18. The baler of claim 17, wherein the controller is configured to adjust the carriage from the deployed position to the stowed position, the first deployed position, and the second deployed position when the external force applied to the carriage exceeds a predetermined amount.

19. A baler for use with a netwrap roll, the baler comprising:
- a frame supported on one or more wheels;
- a housing coupled to the frame and at least partially defining a baling chamber therein;
- a netwrap assembly having a netwrap frame coupled to the housing and at least partially defining a netwrap chamber; and
- a loading device at least partially positioned within the netwrap chamber, wherein the loading device includes:
  - a first frame positioned within the netwrap chamber,
  - a second frame movable relative to the first frame between a frame stowed position and a frame deployed position, and
  - a carriage movable relative to the second frame between a carriage stowed position, in which the carriage is primarily positioned within the netwrap chamber, and a carriage deployed position, in which the carriage is primarily positioned outside the netwrap chamber, and wherein the carriage is configured to support the netwrap roll, and
- wherein moving the second frame between the frame stowed position and the frame deployed position moves the carriage between the carriage stowed position and the carriage deployed position.

\* \* \* \* \*